United States Patent [19]
Kauffmann

[11] 4,091,454
[45] May 23, 1978

[54] SELF-CENTERING DISK HAVING AN ECCENTRIC ELLIPTICAL-SHAPED CENTER LOCATING HOLE

[75] Inventor: Elwood Ludwig Kauffmann, San Jose, Calif.

[73] Assignee: International Business Machines Corporation, Armonk, N.Y.

[21] Appl. No.: 737,947

[22] Filed: Nov. 2, 1976

[51] Int. Cl.² .................... G11B 5/82; G11B 5/012; G01D 15/24; G11B 3/62
[52] U.S. Cl. .................................. 360/135; 360/97; 346/137; 274/39 A
[58] Field of Search ........................ 360/135, 97–99, 360/133; 346/137; 274/39 A, 42 R

[56] References Cited

U.S. PATENT DOCUMENTS

| | | | |
|---|---|---|---|
| 2,155,603 | 4/1939 | Klein et al. | 346/137 |
| 3,130,393 | 4/1964 | Gutterman | 360/98 |
| 3,198,657 | 8/1965 | Kimball et al. | 360/135 |
| 3,258,750 | 6/1966 | Shew | 360/135 |

OTHER PUBLICATIONS

Nordeng, "Flexible Disc Pack", IBM Tech. Disc. Bull., vol. 18, No. 12, May 1976, p. 4128.

*Primary Examiner*—Robert S. Tupper
*Attorney, Agent, or Firm*—James A. Pershon

[57] ABSTRACT

A magnetic disk member for a memory disk file usable in a data processing system includes an eccentric multi-lobed triangular center locating hole to facilitate concentric mounting of the locating hole centerlines in a multiple disk pack memory. The disks are centered in a disk pack by placing onto a drive hub having ribs to match the lobes of the locating holes.

20 Claims, 4 Drawing Figures

SELF-CENTERING DISK HAVING AN ECCENTRIC ELLIPTICAL-SHAPED CENTER LOCATING HOLE

BACKGROUND OF THE INVENTION

This invention relates generally to a dynamic information storage media and more specifically to a specific structure of a disk record carrier and its relation to a disk pack memory.

FIELD OF THE INVENTION

Direct Access Storage Devices of a type commonly referred to as disk drives employ a rotating disk or a plurality or stack of rotating disks as a storage media for data processing equipment. In such devices, one or more disks are mounted for rotation about a fixed vertical or horizontal axis in proximity to an accessing mechanism which carries an array of read/write transducing head on a supporting mechanism. The accessing mechanism usually includes a linear motor driving a moveable carriage carrying suspension arms which are radially positioned from the centerline of the recording disks to facilitate movement of the transducer elements radially to the disk surfaces.

The disk pack is rotated at a constant speed while the transducing elements are moved to discrete positions along a radius of a disk so data can be recorded and readback from data tracks forming concentric circles on the disk surface. In present day devices, these data tracks are very closely spaced in order to increase the data information recorded on each disk surface. To permit accurate concentricity of each data track, the center locating hole of each disk must be held within an extremely close tolerance with respect to the drive hub such that the disks do not shift from the centerline thereby causing the transducer elements to be displaced from the concentric circles of the data tracks.

DESCRIPTION OF THE PRIOR ART

Heretofore, the center locating hole for each disk has been perfectly round to match the round drive hub of the disk pack. The interfitting center locating hole and hub must be located and machined with precision to prevent a shift of the disk from concentric positioning, especially during the high centrifugal forces placed on the disk during operation. It is the purpose of this invention to provide an improved and more economical disk record member and disk pack drive for use in the rotating storage media.

Non-round connections to strengthen mechanical drives have been used on a shaft to mate with a hub in mechanical drives. A U.S. Pat. No. 2,397,382, issued on Mar. 26, 1946 to J. E. Smith discloses a socket and a shank constructed to form a locking device drive. Both the shank and the socket comprise mating angularly-spaced arcuate bearing surfaces forming parts of cylindrical surfaces. The shank fits into the socket to provide a cylindrical bearing surface to thereby secure substantially axial alignment between the driving and the driven member. The arcuate or eccentric bearing surfaces attach with a wedging locking action. The outer socket includes bearing surfaces that comprise an eccentric-shaped, multi-lobed center locating hole which mates with a similarly shaped hub to match the lobed bearing surfaces. There is no disclosure in this patent of an eccentric-shaped, multi-lobed locating hole for a disk substrate for mating with a ribbed hub for positive central positioning and lateral placement of each disk in a disk pack.

It is, therefore, an object of the present invention to provide a self-centering disk comprising a multi-lobed center locating hole that includes means for storing information on said disk for use as a storage memory.

Individual disks prior to placement into a disk pack are checked for defects in order to pattern the position of the defects and for quality control to discard disks having too many defects. The defects are generally an insufficient layer thickness in the magnetic coating which will not store the magnetic transitions that represents the data information. All mechanical interconnections require a tolerance rating since the mechanism used to form the holes in the disks and the shaft drives for the disks change with usage and between different tools. Thus, the track test using a particular hub might not give the same concentric positioning and the track sensed by the single disk tester might be positioned differently from that of the complete disk pack.

Prior art U.S. Pat. No. 3,156,918, assigned to the assignee of the present invention, discloses a recording disk having multi-lobed holes to solve the problem of precise centering of each disk in a disk pack. The multi-lobed holes in the disk of this patent are not used to drive the disk nor to automatically center the disk with the hub drive member. The lobes of the center hole of the disk are combined with a position sensing means that locates each lobe for accurate positioning. The lobes are sensed to provide an optical verification of the disk positioning and no contact is made between the disk and the driving hub member.

Another object of the present invention, therefore, is to provide an eccentric-shaped polygon center locating hole in a magnetic disk that mates with a hub drive in a disk pack to provide an accurate concentric and lateral positioning of each disk on the hub without requirement for a close tolerance fit.

SUMMARY OF THE INVENTION

In accordance with the present invention, a disk record member for self-centering in a disk file useable as a dynamic memory includes an eccentric multi-lobed center locating hole in a flat substrate comprising the disk together with means such as magnetic transitions for storing information on the disk. The individual disks can be included in a disk pack for processing signals by transducing operations between a transducer and a rotating disk wherein each disk includes a multilobed, concentric center locating hole and information stored thereon in the form of impulses such as magnetic transitions, together with transducing means for sensing the magnetic transitions from the disk for utilization. The disk file includes a rotary drive hub assembly having a number of protrusions equal in number to the lobes of each disk for engaging the center locating hole to drive the disks. Drive means such as an electrical rotating motor are connected to the hub assembly for rotation of a hub assembly, and the disks via the protrusions of the hub. The disk file includes means for loading the disks into intimate contact with the transducer means such as a linear motor, a carriage, and positioning arms for carrying the transducers to place the transducers into accurate position to write data onto the disk in concentric track positions and to read the information therefrom.

An object of the present invention, therefore, is to provide an enhanced disk record member and an enhanced disk pack memory file.

Another object of this invention is to provide a disk record member that includes a multi-lobed center locating drive hole for accurate centering and driving of the disk without the need for a close tolerance fit between a hub assembly and the locating hole of the disk.

Yet another object is to provide a data processing memory assembly including a rotating disk having a multi-lobed, eccentric center locating hole in each disk and a drive hub assembly having a number of protrusions for engaging said center locating hole to rotate a disk relative to a transducing means.

These and other objects of the present invention become apparent to those skilled in the art as the description proceeds.

BRIEF DESCRIPTION OF THE DRAWING

The various novel features of this invention, along with the foregoing and other objects, as well as the invention itself both as to its organization and method of operation, may be fully understood by the following description of illustrated embodiments when read in conjunction with the accompanying drawing wherein.

DESCRIPTION OF THE PREFERRED EMBODIMENT

Figure 1:
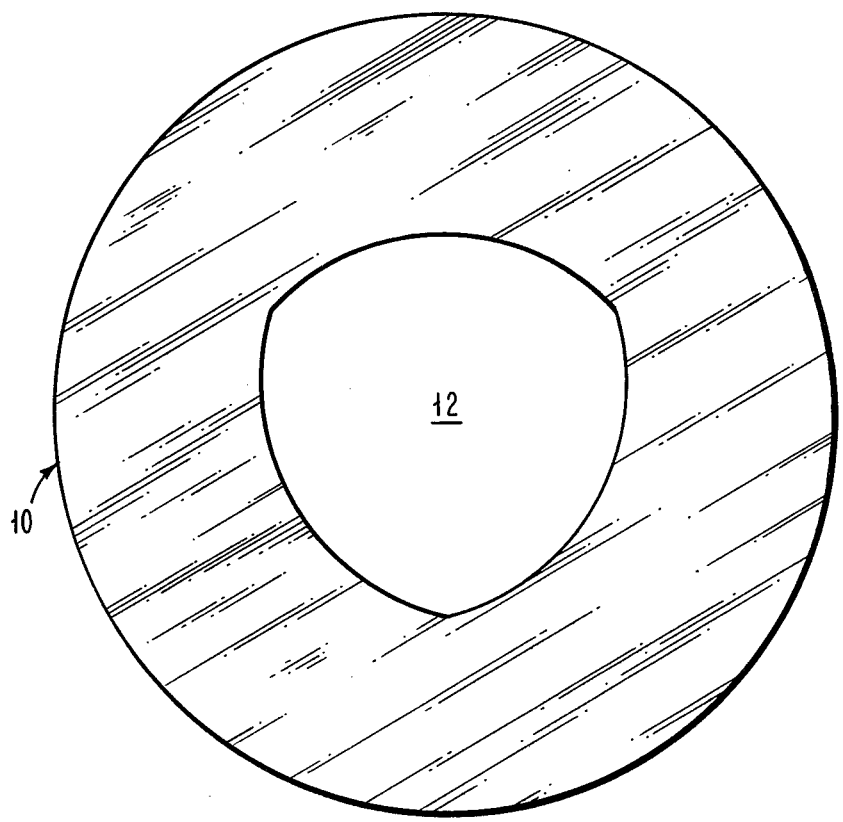
FIG. 1 is a top view of a disk record member having a center locating hole made in accordance with the present invention.

In FIG. 1, a single disk 10 is shown having an eccentric-shaped center locating hole 12. The disk itself can comprise any number of well known materials for use in a data processing system such as an aluminum disk substrate with a spin coated magnetic layer of iron oxide that is magnetizable for storing magnetic impulses; or the disk may be a plastic base for recording audio or optical impulses that can be written on and read from by a transducer element such as a light being produced by a laser system. The recitation of materials used for the disk itself is not meant to be limiting in the materials capable of being used for the disk. The object of the present invention is to provide a recording disk with a center positioning hole that permits close track locations around the periphery of the disks. An enlarged view of the locating hole 12 of the disk 10 is shown in FIG. 2.

Figure 2:
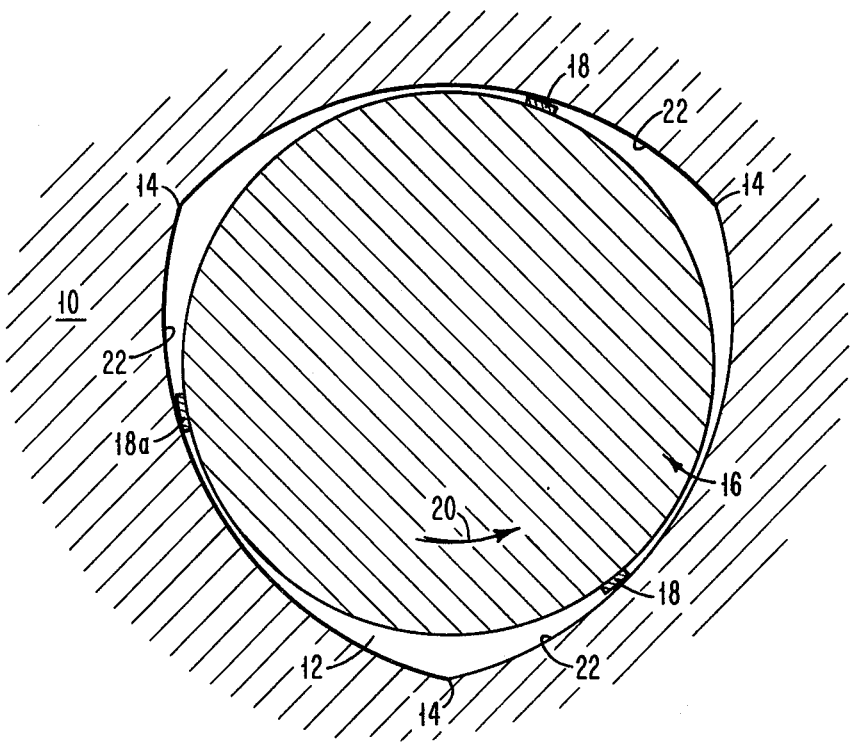
FIG. 2 is an enlarged view of the center locating hole of the disk shown in FIG. 1 together with a driving hub assembly.

Referring to FIG. 2, the eccentric-shape polygon hole 12 of the disk 10 is shown in the preferred embodiment as including three lobes 14 with each lobe spanning approximately 120° of the center locating hole 12. A drive hub 16 having three ribs 18 to match the lobes 14 of a locating hole is shown positioned to rotate a disk in a counterclockwise direction as shown by arrow 20. The number of ribs 18 used in the hubs 16 matches the number of lobes 14 of the center locating hole 2. Any number of ribs can be included on the hub for it is evident that the center locating hole may be a multi-lobed hole. Further, it should be evident that the disk 10 can be positioned for rotation in either direction by contacting the ribs 18 with an appropriate angularly spaced arcuate bearing surface 22.

The angularly spaced arcuate bearing surfaces 22 of the lobes 14 of the disk automatically centers itself around the drive hub 16 by contacting its ribs 18 as the drive hub 16 and disk 10 are rotated relative to each other. The centerlines of the disk and the hub remain concentric. This avoids the potential non-concentric positioning of the disk when the standard method of driving the disk is used.

Figure 3:
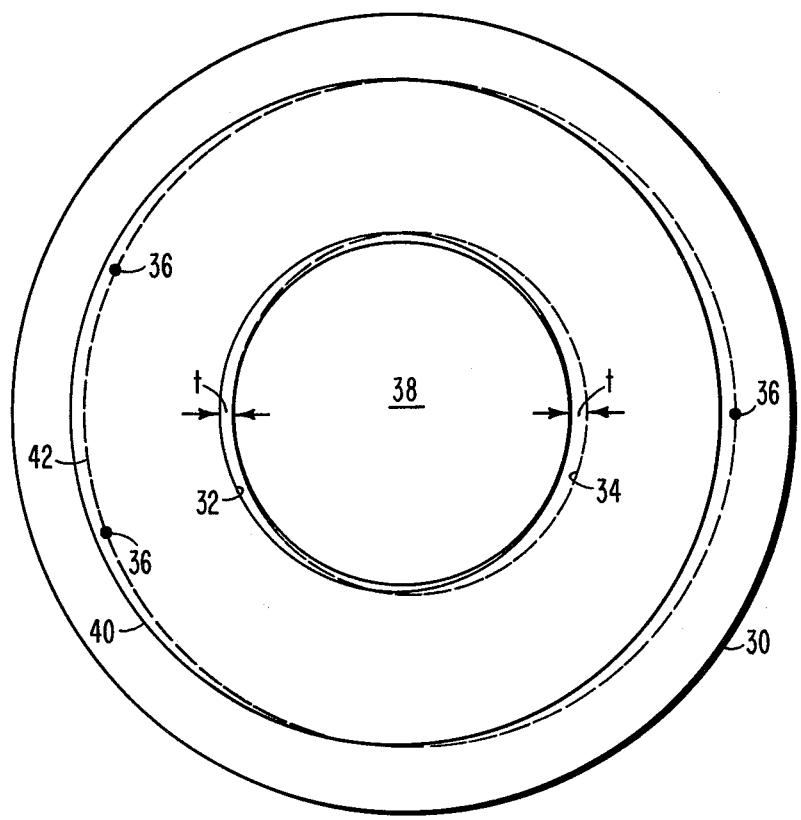
FIG. 3 illustrates the potential non-concentric disk positioning in a prior art assembly.

In FIG. 3, the prior art standard method of driving a disk in the disk pack assembly used in the data processing system is shown. Both the drive hub and the center locating hole are circular. The disks are clamped to the drive hub for rotation thereof. In order to place the disk onto the drive hub a certain tolerance must be provided to allow an operator to place the disk onto the hub. Thus, no matter how closely the tolerances of the hub and disk are controlled, a certain amount of clearance must be provided between the hub and the center locating hole of the disk. This is especially true in a disk pack where a plurality of disks are clamped to a single hub. As is evident, the disks may be placed onto the round drive hub such that the tolerance is locating in any position around the periphery of the hub. It is a requirement especially for data processing use that each disk be individually tested in a manner similar to actual use to obtain a disk with a certain minimum of defects. During a single disk test, the disk may be located with the tolerance at one concentric position and give the indication of a low defect surface. However, when the disk is placed into the final assembly, the tolerance may be an entirely different position and thereby forcing the transducer to sense a different concentric track which may not be as defect-free as the previous test indicated. For instance, in FIG. 3 a disk 30 is illustrated with two disk positions indicated, one having its center locating hole 32 shown as a solid line and one position having its center locating hole 34 shown as a dashed line. Three defects 36 are illustrated spaced on the disk 30. A drive hub 38 is shown of a smaller diameter than the center locating holes of the disks. The tolerance $t$ between the disk 30 and hub 38 is shown to the opposite left (for the solid line position of the disk) and right (for the dashed line position). The tolerance is illustrated in exaggerated form but it should be evident that the entire tolerance is shown in its worst case form, that is, all located at potentially opposite sides.

Information tracks 40 and 42 illustrate a head-transducer position corresponding, respectively, to the disk center locating holes 34 and 32. With the disk positioned with the center locating hole 34 as shown (tolerance t to the right of hub 38), track 40 is mapped by the transducer. In this case, no defects are encountered. However, with the disk shifted in position as shown by the solid lines of the center locating hole 32, the track will shift to the dashed line 42 and the transducer would encounter all three defects 36.

The dashed lines for the center locating hole 34 and its associated track position 40 could be that of the disk 30 during a single disk test. No errors are encountered, the disk passes the test. But, assuming that the tolerance $t$ is positioned to the opposite side of the hub 38 in the disk pack, the transducer will sense the portion of the disk at the dashed lines of track 42. Three defects are encountered which could cause the disk to be rejected. The entire pack must be disassembled to remove and replace this otherwise tested disk. This problem becomes more and more acute as the track densities of the disks become greater.

With the multi-lobed center locating holes of the present invention, see FIG. 2, the assembly of the disk 10 onto the hub 16 can be accomplished with relative ease. The points of the lobes 14 can be positioned directly opposite the ribs 18 of the hub 16. At these points of the lobes, the center locating hole has a relatively larger diameter than that of the ribs. The hub 16 is held stationary while the individual disk 10 is rotated in an opposite direction to the final drive rotation. The direction of rotation can be at either direction since the ribs 18 can be placed into contact with the bearing surfaces 22 in either direction.

Further, since the concentric positioning of each disk is precisely located, balancing of each disk and of the disks in the disk pack is easily maintained. Also, rework of disk packs is made easier in that the disposition of errors in each disk remain at the same track displacement. Sector error disposition can remain the same by marking the original placement of each lobe of a disk with a particular rib of the hub. Replacing the disks in the same position such that the same rib of the hub drives the same bearing surface as before, assures that the sectors of each disk are at the same location.

Figure 4:
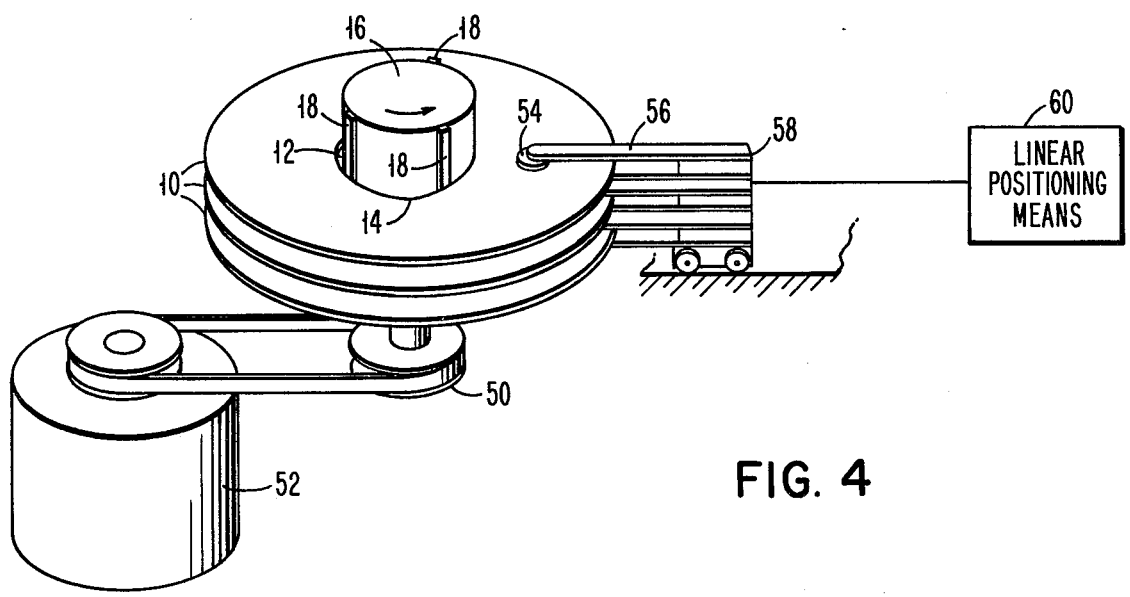
FIG. 4 is an isometric cutaway of a disk pack containing a drive hub assembly according to the present invention.

As is shown in FIG. 4, at least one of the disks having the multi-lobed center locating hole according to the present invention can be combined with a rotary drive hub assembly, a drive means for rotating the hub and the disks, and a transducer mounted to an accessing system for positioning the transducer in conact with the disks for sensing the information stored on the disk. Each disk is placed onto the drive hub such that the points of the lobe are directly opposite protrusions located around the circumference of the drive hub. Once the disk is positioned on the drive hub, the disk is rotated in a direction opposite to the eventual drive rotation to lock the disk in place by having the protrusions contact the respective bearing surfaces of the disk. If more disks are to be placed into the disk file, a spacer is then placed over the disk to permit the transducers to sense the disk surface by passing over the surface of the disk. The next disk can then be similarly positioned over the drive hub and again rotated opposite to the driving rotation to contact the arcuate bearing surface portion of the center locating hole of the disks. Each disk of the disk file can be similarly placed to form the eventual disk pack with a plurality of disks or a single disk as desired. A clamping means can be placed over the drive hub to prevent the movement of the disks of the drive hub during operation.

As illustrated in FIG. 4, a magnetic memory disk pack is shown for recording and reading magnetic impulses. The disk pack includes a rotatable spindle 50 rotated by an electric motor 52 for driving the hub 16 of a hub assembly. The hub 16 drives the plurality of disks 10, each separated to allow access by a plurality of magnetic recording heads 54. Each head 54 is secured to a slider arm 56 at its outer extremity. The slider arms 56 are fastened to a carriage 58 moveable transverse to the rotation direction of the disks 10. The carriage 58 is controlled by a linear positioning means 60 such as a voice coil motor (not shown) to bring the magnetic heads 54 into intimate contact with the disks 10.

The magnetic recording heads 54 are a conventional "flying head" having an air-bearing surface to enable the head to fly slightly spaced from the recording surface of each disk. The disks 10 can each be a standard disk having a substrate made from aluminum or an aluminum alloy such as aluminum and manganese with a spin coated layer of a magnetizable material such as an iron oxide in a binder. The heads 54 together with the arms 56, the carriage 58, and the linear positioning means 60 form a means for positioning or loading a transducer means in each head into intimate contact with the magnetic layer of the disks to form or sense magnetic impulses in a manner well known.

The center locating holes 12 of each disk are formed in accordance with the present invention to include eccentric, elliptical shaped lobes 14 for contacting multiple protrusions on the hub 16. As shown in the preferred embodiment of FIG. 2, three lobes 14 are shown in each disk 10 for contacting three ribs 18 in the hub 16 of the hub assembly. With the counterclockwise drive as shown, to assembly the disk pack, each disk 10 is placed in turn on the hub assembly with each lobe 14 positioned opposite its associated rib 18. The hub assembly is held stationary and the disk being placed into the disk pack is rotated clockwise to center the disk by forcing the ribs 18 into contact with the eccentric shaped arcuate bearing surface 22 of the center locating hole 12. After all of the disks are mounted in this manner, a hub clamp (not shown) is placed over the disks to hold them from further movement relative to the hub.

Another advantage of the multi-lobed center locating hole 12 for the disks 10 is that a disk pack can be disassembled without destroying the position of one disk relative to the remaining disks in the pack. The rough positioning of each disk can be marked by marking a particular lobe 14 of each disk 10 to a particular projection such as the rib 18a of the hub 16 in FIG. 2. All of the disks can be dismantled from the disk pack and replaced by retaining the same lobe in contact with the marked rib 18a of the drive hub. Thus when the disk is rotated in contact with the ribs 18, the disk will be positioned in the same position relative to the drive hub. The next disk is inserted in the same manner and, after rotation to contact the ribs of the drive hub, is positioned in the same location relative to the other disks in the disk file as that before the dismantling of the disk file.

The principles of the present invention have now been made clear in an illustrative embodiment. It will be immediately obvious to those skilled in the art many modifications of structures, arrangement, proportions, the elements, materials and components used in the practice of the invention. For instance, disk files are normally used in data processing systems to store magnetic information on aluminum substrates having an iron oxide coating formed thereon. It should be evident from the foregoing description that disks for use in optical systems can make advantageous use of the multi-lobed center locating hole according to the present invention. The disks may be non-metal such as glass or plastic and may be a plated magnetic layer or a coated particulate magnetic layer, or include a deformed optical path for use in optical reading of surface deformation of the coating placed on the disk surface. Further, although the particular advantage of the instant invention is toward retaining the concentric positioning of circular data tracks, it is evident that the same advantages can be obtained relative to spiral tracks. The appended claims are therefore intended to cover and embrace any such modification, within the limits only of the true spirit of the invention.

I claim:

1. A disk record member for self-centering around a drive hub in an assembly comprising:
   a flat substrate essentially circularly shaped;
   a multilobed center locating drive hole in said substrate; formed from eccentric arcuate bearing surfaces; and
   means for storing information on said substrate.

2. A disk record member as defined in claim 1 wherein said center locating drive hole comprises three equal lobes formed from three equal arcuate bearing surfaces.

3. A disk record member as defined in claim 1 wherein said substrate is made from aluminum or an aluminum alloy.

4. A disk record member as defined in claim 1 wherein said means for storing information comprises a layer of a magnetizable iron oxide compound.

5. A disk file for processing signals by transducing operation between a transducer and a rotating disk comprising:
   at least one disk each having a multilobed center locating hole including angularly spaced eccentric arcuate bearing surfaces and with each disk having information stored thereon in the form of impulses;
   a transducer means for sensing the impulses from said disks;
   a rotary drive hub assembly having a number of protrusions equal in number to the lobes of said disk for engaging said arcuate bearing surfaces of said center locating hole of each disk to drive said disks;
   drive means connected to said hub assembly for rotating said hub assembly and said disks; and
   means for loading said disks into intimate contact with said transducer means.

6. A disk file as defined in claim 5 wherein said center locating hole of each disk comprises three equal lobes formed from three equal arcuate bearing surfaces.

7. A disk file as defined in claim 5 wherein said disk comprises a flat substrate essentially circularly shaped and includes means for storing information on said substrate.

8. A disk file as defined in claim 7 wherein said substrate is made from aluminum or an aluminum alloy.

9. A disk file as defined in claim 7 wherein said means for storing information comprises a layer of a magnetizable iron oxide compound.

10. A disk file as defined in claim 5 wherein said hub assembly includes three ribs for engaging said center locating hole of each disk having three equal eccentric lobes.

11. A disk file as defined in claim 5 wherein said transducer means is adapted for imprinting the information stored on said disks.

12. A disk file as defined in claim 5 wherein said transducer means senses magnetic impulses.

13. A disk file comprising:
    at least one disk each having a multilobed, center locating hole formed from angularly spaced eccentric arcuate bearing surfaces and with each disk having information stored thereon in the form of impulses; and
    a rotary drive hub assembly having a number of protrusions equal in number to the lobes of said disk for engaging said arcuate bearing surfaces of said center locating hole of each disk to drive said disks.

14. A disk file as defined in claim 13 wherein said center locating hole of each disk comprises three equal lobes formed from three equal arcuate bearing surfaces.

15. A disk file as defined in claim 13 wherein said disk comprises a flat substrate essentially circularly shaped and includes means for storing informaton on said substrate.

16. A disk file as defined in claim 15 wherein said substrate is made from aluminum or an aluminum alloy.

17. A disk file as defined in claim 15 wherein said means for storing information comprises a layer of a magnetizable iron oxide compound.

18. A disk file as defined in claim 13 wherein said hub assembly includes three ribs for engaging said center locating hole of each disk having three equal eccentric lobes.

19. A disk file as defined in claim 13 further including a transducer means for sensing the impulses from said disks.

20. A disk file as defined in claim 19 further including a means for loading said transducer means into intimate contact with said disk.